March 16, 1965  F. D. COTTERMAN ET AL  3,173,650
BUTTERFLY VALVE SEAT CONSTRUCTION
Filed March 5, 1962  4 Sheets-Sheet 1
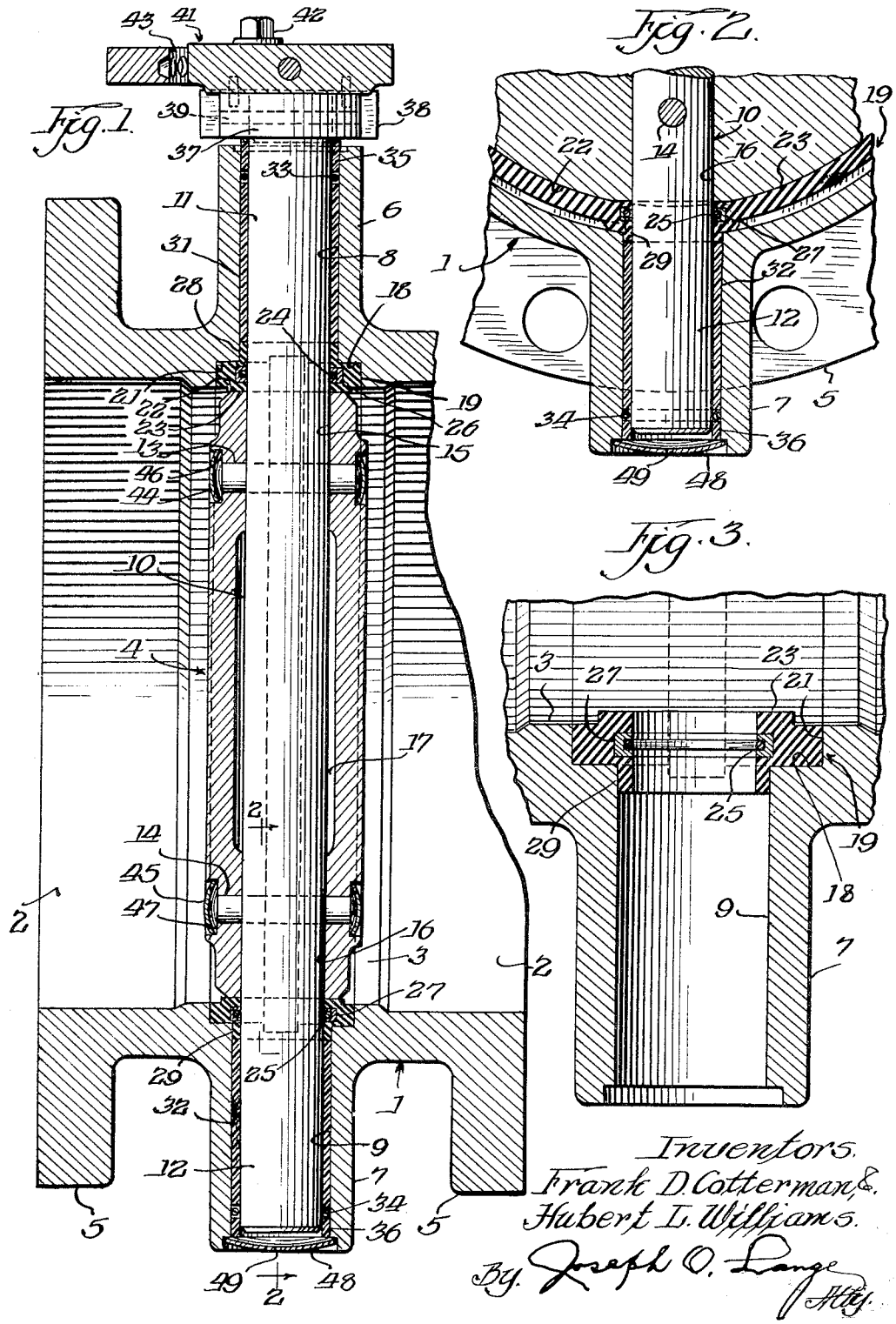
Inventors.
Frank D. Cotterman &
Hubert L. Williams.
By Joseph O. Lange
Atty.

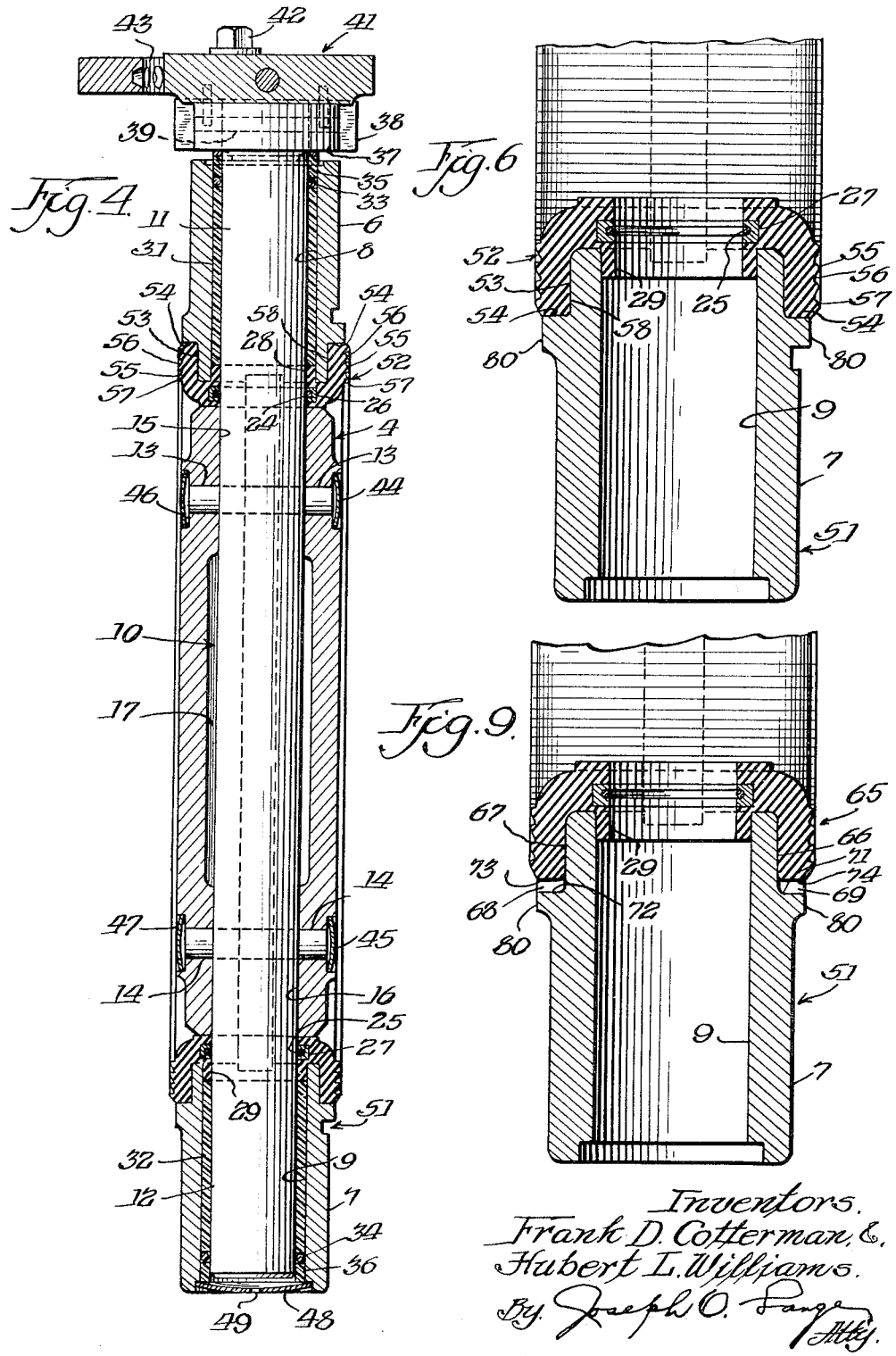

March 16, 1965  F. D. COTTERMAN ETAL  3,173,650

BUTTERFLY VALVE SEAT CONSTRUCTION

Filed March 5, 1962  4 Sheets-Sheet 4

Inventors.
Frank D. Cotterman, &
Hubert L. Williams.
By Joseph O. Lange
Attys.

United States Patent Office 3,173,650
Patented Mar. 16, 1965

3,173,650
BUTTERFLY VALVE SEAT CONSTRUCTION
Frank D. Cotterman, La Grange, and Hubert L. Williams, Hinsdale, Ill., assignors to Crane Co., Chicago, Ill., a corporation of Illinois
Filed Mar. 5, 1962, Ser. No. 177,402
3 Claims. (Cl. 251—306)

This invention relates generally to butterfly valves, and, more particularly, the invention is concerned with improvements in the construction of such types of valves resulting in better all around performance and more flexible operation in a variety of services.

At the outset, in order to obtain a better appreciation of the benefits flowing from this contribution, it should be understood that in valves of this general type, it is important that the construction of the valve permit a relatively wide degree of latitude in the manner of its installation and the response of the valve to a large number of services in the field involving a wide scope of fluids to be handled.

It is accordingly one of the principal objects of this invention to provide a butterfly valve construction in which the valve is capable of being easily operated in the wide variety of services referred to. Further, such constructions should be reasonably economical not only from the standpoint of original manufacture, but also from the equally important standpoint of repair, maintenance, or inspection in the field afterward.

A further object is to provide for a butterfly valve construction in which what is termed by those skilled in the art as the wafer type of valve may easily be employed without sacrificing the desirable elements of the overall construction.

A still further important object is to provide for a relatively simple butterfly valve construction in which the guiding of the closure member therefor is done effectively and in an easily maintained fluid tight manner.

Another important object is to provide for a valve construction in which the pivotally mounted closure member or disc is so applied to the valve seat within the casing that it becomes relatively easy to provide for a fluid sealing tightness in the valve seated or closed position.

Another important object is to provide for a butterfly valve closure member in which the attachment between the said closure member and the operating stem or shaft is preferably trunnioned at upper and lower portions of the closure member, and can be positively connected while providing relatively fluid sealing means for the protection of such connection in service.

A still further important object is to provide for fluid sealing means on both the upper and lower portions of the trunnions for the said shaft or stem in which the fluid sealing means employed is comparatively easily assembled and also inspected, replaced or repaired without involving expensive or lengthly shutdowns of the valve and the pipe line.

Another important object is to provide for a valve seat for the butterfly valve closure member in which the said seat is not only capable of responding to the piping strains or loads normally encountered in the course of assembly of the valve pipe line, but also possessing the important benefits of handling such distortion or extension of the seating member as a result of such assembly that actually improved to a substantial degree the sealing contact between a peripheral portion of the closure member and the inner annular fluid sealing contact surface provided by the seat between the respective upper and lower trunnion mountings of the stem.

In the latter connection, another important result of the construction as will hereinafter be explained in greater detail follows that a beneficial spheroidal and preferably resilient type of seat contact is made between such peripheral portion of the closure member and the peripheral seat therefor in the course of normal valve assembly.

A still further object is to provide in the seat member of the valve having what is known to those skilled in the art a labyrinth type of outer sealing surfaces at opposite flanged portions of the said seat which fits against the gasket face of abutting pipe flanges when assembled in the pipe line.

Another important object is to provide for a valve casing or body construction in which at least one of the said trunnions may be suitably drained or vented to atmosphere.

Another object is to provide for a butterfly valve construction in which the installation of the valve seat is obtainable either by molding a non-removable type of seat into the valve casing or providing such flexibility that the valve seat may be removably mounted in the valve casing.

Other objects and advantages flowing from this invention will become more readily apparent upon proceeding with the following description read in light of the accompanying drawings, in which:

FIG. 1 is a fragmentary sectional assembly view of a butterfly valve embodying our invention and employing a valve seat of the molded-in type;

FIG. 2 is a fragmentary sectional view taken on the line 2—2 of FIG. 1;

FIG. 3 is a magnified view of the details of a lower portion of the valve showing the seat and the sealing means employed and at 90 degrees to the section shown in FIG. 2;

FIG. 4 is a sectional assembly view of a modified form of wafer type valve with a molded-in seat construction;

FIG. 6 is a magnified fragentary sectional view of the molded-in seat together with the sealing arrangement employed in FIG. 4;

FIG. 9 is a magnified fragmentary sectional view showing the replaceable annular valve seat as distinguished from the molded-in type.

Similar reference numerals refer to similar parts throughout the several views.

Figure 5:
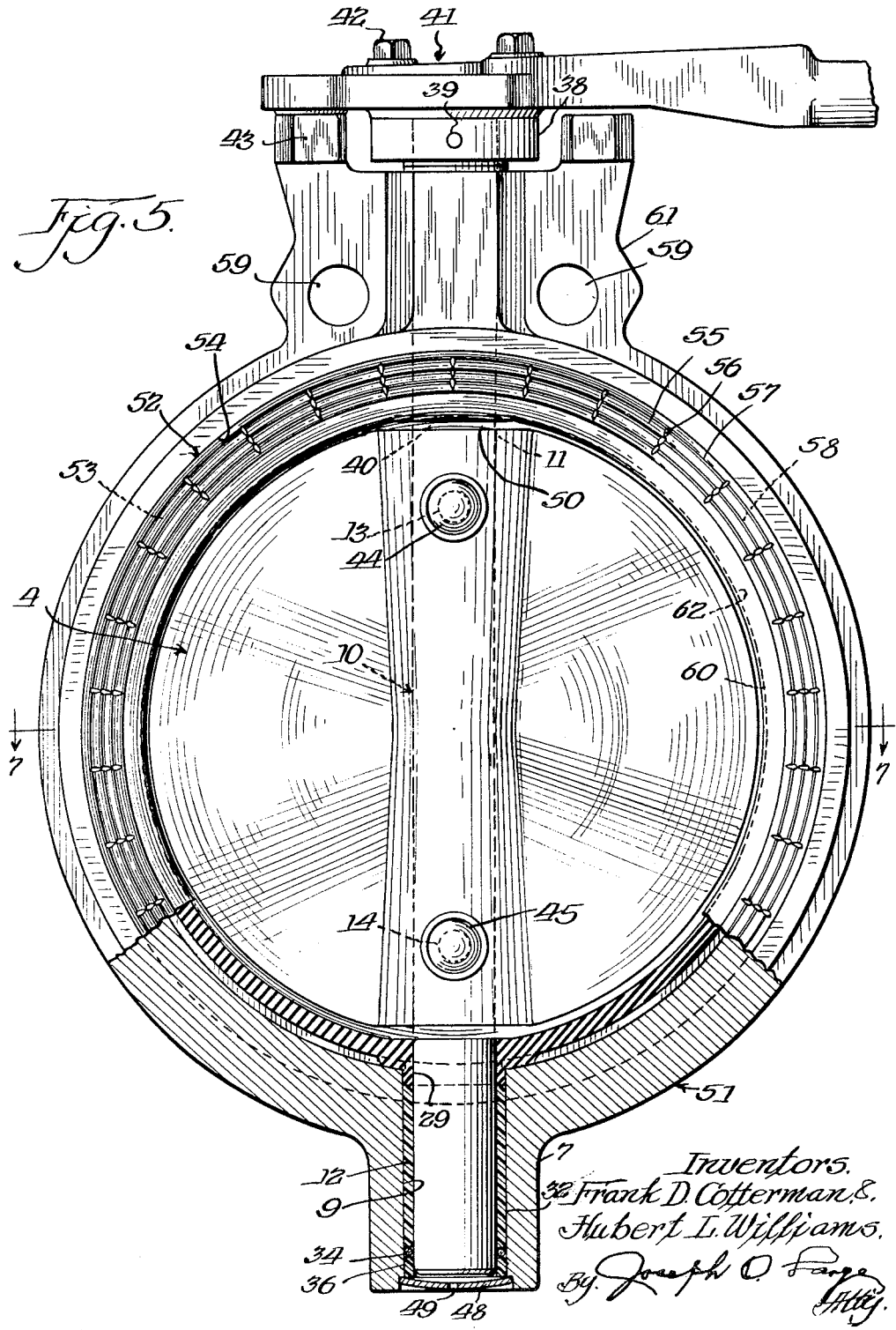
FIG. 5 is an end view of the construction shown in FIG. 4.

Referring now to FIG. 1, a valve casing or body generally designated 1 is shown having the usual through ports, and having a valve chamber 3 therebetween normally interrupted by a valve closure member generally designated 4, description of which will follow in greater detail later. The valve casing 1 is provided with the usual end flanges 5 for effecting the connection of the said valve body with a pipe line (not shown). It will, of course, be appreciated that while flanged ends are illustrated other suitable forms of connection with a pipe line may be provided, such as welding ends, threaded pipe ends, brazed connections and the like.

The valve body 1 at diametrically opposite portions thereof and on the central axis thereof is provided with the upper and lower hollow extensions therefrom respectively designated 6 and 7. These extensions are made bored, so that as indicated at 8 and 9, respectively, the upper and lower shaft or stem portions 11 and 12 may be received to function as trunnions for the closure member. The said portions of the shaft 11 and 12 form an integral part of the stem generally designated 10. At inner portions of the closure member generally designated 4, the shaft portions are pinned as at 13 and 14 to the closure member, the pins extending transversely to the stem or shaft 10 as illustrated.

At the upper and lower portions of the closure member 4, the closely machined surfaces 15 and 16 are provided therein to engage relatively closely the respective outer peripheral portions of the shaft entering the surfaces 15 and 16 of the closure member whereby to improve the nature of the pinned connection between the shaft 10 and the closure member 4. Preferably, although not necessarily, the closure member may have the central relieved chamber 17 as indicated. This arrangement is for purpose of defining the respective lengths of connections at 15 and 16. On certain smaller sizes of valves, it may be omitted and the shaft contact therefore will extend guided completely through the closure member 4. Within the annularly relieved portion 18 of the valve body, a substantially annular seat generally designated 19 is fitted in which the contact between the annular surface 18 and the side limits at 21 snugly receive the said seat 19.

The relationship between the external peripheral surface 22 of the closure member 4 and the inner peripheral surface 23 of the seat 19 is preferably so proportioned that a degree of compression annularly exists between the respective peripheral surfaces 22 and 23, thereby enhancing fluid tightness with the pivotally movable closure member in the valve closed position indicated. In order to insure proper sealing against the escape of fluids on the upper and lower shaft portions 11 and 12, upper and lower O-rings 24 and 25 respectively are provided, the latter being encased in annular members preferably of a suitable metal and designated 26 and 27, thereby snugly engaging the respective upper and lower shaft portions 11 and 12 of the shaft 10 as indicated. It will be appreciated that the valve seat 19 on both of its opposite trunnion portions as indicated at 28 and 29 are provided with the integral annular extensions seated within the respective upper and lower annular surfaces 8 and 9 of the oppositely disposed extensions 6 and 7 of the valve casing 1. These extensions in addition to receiving said stem 10, serve to locate the rotative position of the seat ring 19 relative to the valve central axis. Similarly and for the same purpose, a preferably non-metallic bearing liner 31 and 32 is fitted outwardly beyond the respective portions 28 and 29 of the valve seat 19. While mention is made of it being preferably non-metallic, it will of course be appreciated that such liner as at 31 and 32 may be of any suitable material, depending upon the nature of the service encountered. At the outer limits of the respective liner 31 and 32, O-rings 33 and 34 may be interposed between inner end portions of the liners 35 and 36. All of the foregoing description applies to a means for not only sealing in relatively fluid tight relationship the stem 10 at its upper and lower limits, but also providing for double journalling and guiding of the said stem, realizing that the bearings at these surfaces within the respective bearings at 8 and 9 serve as the means for supporting the valve closure member 4 in the course of its operation in service. The upper end of the transverse extension 6 permits of the shaft portion 37 extending sufficiently beyond the liner 35 to enable for the interpositioning of the coupling 38 fastened by means of a pin 39 to the upper limit of the shaft portion 11 and upon which the operating handle generally designated 41 is applied and suitably attached against removal by means of a cap screw 42 applied to the member 38. As indicated at 43, suitable stops may be arranged to limit the rotation of the closure member and shaft to substantially 90 degrees of movement in the course of opening and closing the valve.

The upper and lower pins 13 and 14 providing for the connection between the closure member and the shaft are preferably sealed at their outer limits by means of suitable closures commonly known to those skilled in the art as Welch plugs 44 and 45 and as indicated are of annular configuration when viewed in plan and are of a resilient concave convex construction, enabling them to fit snugly within the counterbore indicated at 46 and 47.

In the connection with suitably sealing the valve casing 1 and particularly with respect to the transverse bearing or trunnion provided at 9 a resilient closure such as a Welch plug 48 is applied in substantially the same manner as in connection with the Welch plugs 44 and 45. However, in order to indicate any possible leakage past the respective liners and sealing medium, a drilled hole or drain 49 is provided in the plug 48. From the description given, it will now be understood that a relatively simple but effective butterfly valve construction has been provided in which not only is effective fluid sealing obtained between the closure member and the valve seat but of equally vital importance suitable sealing of the trunnions for the respective shaft portions 11 and 12 has been accomplished.

Referring now to FIG. 4, what is known to the trade as the wafer-type of construction of butterfly valve is illustrated. The valve casing generally designated 51 has the oppositely disposed sealing means for effecting the end connection or joints in the pipe line hereinafter explained at greater length. It should be understood in considering this construction that in installation in piping systems, the valve is interposed between suitable pipe flanges (not shown) which accounts for the relatively short face to face of the valve casing 51 and in which the length thereof is measured by the width of the valve seat generally designated 52, molded in place to bear against the recesses 53 and having the peripheral portion thereof snugly molded in the recess limits at 54. The seat 52 snugly receives the closure member 4 in the same manner as described in connection with FIGS. 1 to 3 inclusive and the construction of the closure member 4 follows the same general pattern of assembly with respect to the shaft 10 and the pins 13 and 14 for effecting the attachment as described in connection with the previous figures. It will, however, be noted that in connection with the assembly of the valve seat 52 within the casing 51, the oppositely disposed outer end annular limits 55 are of a configuration on the surface 56 described as the labyrinth or grid type of surface which is shown in greater detail in the end view of FIG. 5. It will be apparent from a study of the view in FIG. 5 that the labyrinth or grid type of surface allows for predetermined raised face contacts as at 56 and 57. It will be understood that the labyrinth or grid type of gasket facing hereinabove immediately described and incorporated as part of the rubber seat of the wafer-type valve allows for a network of deformable raised radial ribs surrounding a number of cylindrical concentric ribs of the same height as the ribs first mentioned. The opposite side of the gasket as at 58 of the molded gasket is preferably smooth and fits against the valve body in its molded condition as illustrated. The ribbed sides above described fit against the gasket face of the abutting flanges (not shown) when assembled in the pipe line, thus providing a large number of fluid trapping pockets which are formed between the raised ribs constituting the labyrinth of grid configuration referred to. The ribbing referred to aids in effecting a tight fit against the said pipe flange and the comparatively narrow width of the ribs, thus aids in providing for their compression or deflection under the bolt load normally received during the course of their assembly of the valve with and between the said pipe flanges.

The said ribbing in effect provides for a pressure concentration on the ribs and positive gasket sealing, and thus any fluid leakage therepast is necessarily limited to a small area of depressed pockets or recesses and does not escape to the outside or peripheral portion defined by the gasket. It will be understood that in connection with the wafer-type of construction illustrated in FIGS. 4, 5, and 6, that it is unnecessary to repeat the description in connection with the assembly and the operation of the valve because the only difference from that construction shown in FIG. 1 is that in the latter case the flanges are integrally provided as part of the casing 1, while in the wafer construction the valve is flangeless and is installed in the piping between two oppositely disposed flanges of the piping against the integral gasket face 55 of the valve seat 52. The valve casing 51 is provided with the oppositely disposed extension 6 and 7 as described in connection with FIG. 1 and all of the other parts are relatively the same and bear the same relation in assembly as described in connection with FIGS. 1 to 3 inclusive. To facilitate assembly between the said flanges, the bolt 59 (see FIG. 5) are preferably included in the extension 61 of the casing 51.

Figure 7:
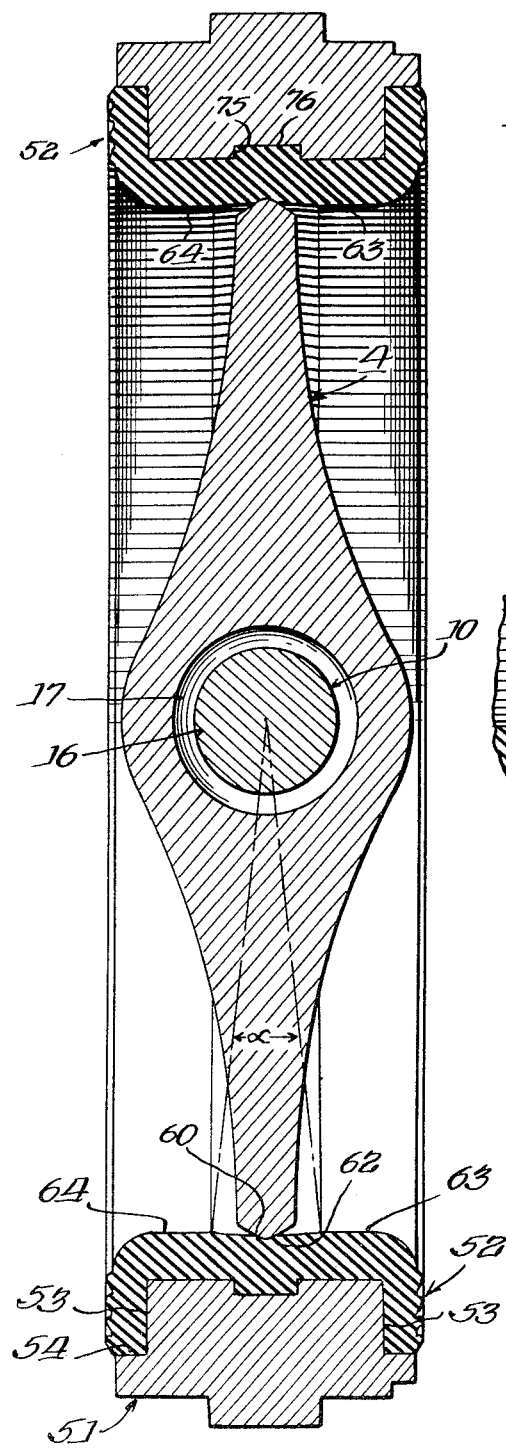
FIG. 7 is a fragmentary sectional assembly view taken on the line 7—7 of FIG. 5.
Figure 8:
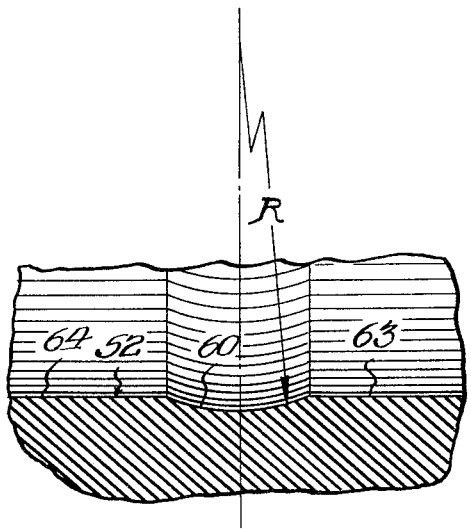
FIG. 8 is a magnified sectional view of the spheroidal valve seating employed in connection with FIG. 7.

In connection with FIG. 6, it should be appreciated that the seat 52 indicated is vulcanized to the metal body 51 and as illustrated thereby abuts against the annual shoulder at 54. When applying the bolt load to the flanges for retaining the wafer-type valve in the pipe line, the valve seat material is prevented from exuding outwardly past the annular shoulder 54 and thus causes the composition material to be displaced inwardly. There will be no escape past the surfaces 80. As shown in the magnified views of FIGS. 7 and 8, it will be noted that the outer peripheral portion of the valve closure member 4 and as indicated at 62 in the normal course of its assembly with the seat ring generally designated 52 forms end indentations of somewhat spheroidal cross-section as indicated at R in FIG. 8. It will be noted further, however, that in support of the outward deflection or spheroidal form of deformation occurring as indicated in the magnified view of FIG. 8, the seat ring 52 is suitably provided with the annular rib 76 fitted snugly within the annular recess 75 of the wafer-type casing 51. The advantage of this construction lies in not only centering the seat with respect to the axial positioning on the casing 51, but it also serves to support and receive that portion of the ring as at 76 which is received within the annular recess 75 against such undesirable distribution of distortion beyond that portion of the valve seat actually contacted by the peripheral portion 62 of the closure member on the seat surface 60 in the course of opening and closing the valve. The radius of curvature of the spheroidal surface 60 is indicated by the letter R on the radius. In connection with the structural details set forth, it will be understood that the usual resilient seat butterfly valve is provided with a cylindrical seat, thereby giving maximum interference between the valve closure member and the composition seat and thus minimum leakage pressure occurs when the valve closure member is seated at exactly the 90 degrees position.

In the instant invention, the valve seat being provided with the spherical depression of constant width and depth as hereinabove described and extending from one end flat portion as indicated at 63 and 64 provides for a constant interference between the valve closure member and the valve seat. In effect, this provides constant tightness when the valve closure member is rotated on either side of the seated or closed positions. It will, of course, be appreciated that with this construction, some variation in the seated position of the closure member can be tolerated and suitable compensation may be made for such seat wear as may occur by simply adjusting the external stops 39 to halt or predeterminately position the closure member in such changed position as wear occurs between the valve closure member and the valve seat. It will be furher appreciated that during the course of actually molding the valve seat into the valve body or casing, the spherical or concave seat surface is obtained automatically as at 60 in FIGS. 7 and 8.

It has been discovered that when a rubber seat is molded into a butterfly valve body containing a circumferential groove extending from shaft hole to shaft hole, the greater shrinkage in the thicker rubber at the groove automatically creates a depression in the seating face similar to that described.

In connection with the spherical seat construction, it will be appreciated that it is desirable from the design and manufacturing standpoints to provide some leeway in the positioning of the valve closure member as above referred to when seating the valve and also being able to compensate for such wear as may occur between the seating surfaces of the closure member and the valve seat. In connection with the designation of the radius indicated at R in the magnified view of FIG. 8, the radius of the spherical depression shown is equal to the radius of the closure member minus the desired radial interference desired between the closure member and the valve seat.

It will also be understood that while in all instances the description here has been concerned with a spherical surface, variations in the shape of such seating surface depending upon circumstances encountered would be possible. In connection with FIG. 7, it will also be understood that the angle indicated at $\alpha$ is the measure of the constant interference between surfaces 60 and 62, while the closure member is rotating through the said angle $\alpha$. In further consideration of the disclosure shown and described in FIGS. 7 and 8, it will be appreciated that a uniform depth, width, and radius of the spherical depression in the seat as defined by the surface 60 extends around the entire circumference, except at the flat portions and thus the surface 60 is flattened as indicated at 40 in the area defined by the flattened annular surface 50.

Referring now to the further modified construction in FIG. 9, the valve casing is identical to that described in connection with the wafer-type of construction in FIG. 5. However, the valve seat is of the renewable type 65 which means that the said valve seat is replaceable and is easily attached to the valve casing 51 on the peripheral surface portions 66 and 67 extending annularly completely around the casing except for that portion interrupted to provide the upper and lower bearings, the lower bearings only being shown. In this construction, it will be apparent that the same type of labyrinth facing as at 56 and 57 of FIG. 5 is applied. An annular cavity or space designated 68 and 69 annularly on each side of casing 51 is provided between the shoulder 71 and 72 and the outside diameter of the gasket portion of the seat as indicated at 73 and 74 respectively, the latter spaces 68 and 69 are not occupied or filled in by the gasket portion limits as defined at 73 and 74 until the assembly wtih the pipe flanges (not shown) has been completed and the attaching or assembly bolts have been drawn up to the desired limits for the normal installation. Thus the grid type facing employed and hereinabove previously described provides in the gasket face of the rubber seat for additional volume to be provided for the seat ring so that when the rubber of the flanged portion of seat ring 65 defined at 73 and 74 is compressed a sufficient space measured by the cavity indicated is almost completely filled when the metal-to-metal contact is made between the flanged face of seat ring 65 and the face of the abutting flanges for this installation, thus preventing further loading and compression of the rubber gasket facing and subsequent damage to the rubber-like material.

While a plurality of embodiments has been disclosed and described herein, it should be apparent that the manner of exemplifying our invention is capable of being set forth in many other modifications falling within the spirit of our invention. We desire, therefore, to be limited only to the extent of the claims appended hereto interpreted in light of such limitations as may be imposed by the state of the art.

We claim:

1. A butterfly valve, comprising a casing having an annular seat portion formed with a seating face;

a disc member pivotally mounted in said casing;

a rotatable stem in trunnions within said casing for actuating said disc member in its pivotal movement relative to said casing;

pin means mounted between said stem and disc member to retain said latter members in relative non-rotatable relation;

the said disc member having renewable deformable fluid sealing means mounted in recesses of said closure member at end limits of said pin means;

the said renewable fluid sealing means being of a resilient concave convex construction and being fluid pressure responsive whereby to effect the deformation of said fluid sealing means to snugly engage side wall portions of said closure member defining said recesses upon the application of line fluid pressure thereto;

said annular seat portion including a peripheral outwardly flanged member with the flanged portions thereof spaced apart to form the end limits of the seating face;

the intermediate portion of the seating face between said outwardly flanged portions providing for said seating face being of a spherical depression of substantially constant width and depth to form an annular concave contact face with the periphery of said disc member except for that portion forming the connection with the said stem;

the said seating face upon predetermined pivotal movement of said disc member causing radially outward displacement of said seating face to form an annular recessed contact with the periphery of said disc member substantially of spherical arcuate configuration when viewed in cross-section.

2. A butterfly valve, comprising a casing having oppositely disposed annular recesses at end portions thereof;

an annular renewable seat portion formed with a seating face;

a disc member pivotally mounted in said casing;

a rotatable stem in said casing for actuating said disc member in its pivotal movement relative to said casing;

said annular seat portion including a peripheral outwardly flanged member with the flanged portions thereof spaced apart to form the end limits of the seating face;

the said flanged portions being received snugly within said casing recesses, the depth of said recesses being less than the thickness of said flanged portions whereby to permit said flanged portions to project beyond said recesses of the casing;

the outer peripheries of said flanged portions being substantially less than the diameter of the walls defining said recesses whereby to provide an annular clearance between said flanged portions and said recesses;

the intermediate portion of the seating face between said outwardly flanged portions providing for said seating face being of a spherical depression of substantially constant width and depth to form an annular contact face with the periphery of said disc member except for that portion forming the connection with the said stem;

the said seating face upon predetermined pivotal movement of said disc causing radially outward displacement of said seating face to form an annular recessed contact with the periphery of said disc member substantially of spherical arcuate configuration when viewed in cross-section.

3. A butterfly valve, comprising a casing having an annular resilient seat formed with a seating face;

a disc member pivotally mounted in said casing;

a rotatable stem in said casing for actuating said disc member in its pivotal movement relative to said casing;

flexible closure means in said casing at an end limit of the said stem engaging said casing and spanning said end limit of the stem;

pin means mounted between said stem and disc member to maintain said latter members in relative non-rotatable relation;

the said disc member having renewable deformable fluid sealing means mounted in recesses of said closure member at end limits of said pin means;

the intermediate portion of the said annular seat substantially midway between end limits of said annular seat providing for said seating face, the latter face being of a spherical depression of substantially constant width and depth to form an annular concave contact face with the periphery of said disc member except for that portion forming the connection with the said stem;

the said seating face upon predetermined pivotal movement of said disc member causing radially outward displacement of said seating face whereby to contact the periphery of said disc member.

References Cited by the Examiner

UNITED STATES PATENTS

| 1,969,795 | 8/34 | Hewitt | 277—207 |
| 1,977,351 | 10/34 | Phillips | 251—306 |
| 2,884,224 | 4/59 | Fawkes | 251—306 |
| 2,936,153 | 5/60 | Gaffin | 251—306 |
| 2,939,674 | 6/60 | Anderson | 251—173 |
| 2,959,431 | 11/60 | Foss | 277—211 |

FOREIGN PATENTS

| 1,181,609 | 1/59 | France. |
| 780,870 | 8/57 | Great Britain. |
| 157,406 | 1/57 | Sweden. |

WILLIAM F. O'DEA, *Primary Examiner.*